United States Patent [19]

Hallerback

[11] Patent Number: 4,796,743

[45] Date of Patent: Jan. 10, 1989

[54] CLUTCH RELEASE BEARING ASSEMBLY

[75] Inventor: Stig Hallerback, Vastra Frolunda, Sweden

[73] Assignee: AB SKF, Gothenburg, Sweden

[21] Appl. No.: 47,656

[22] Filed: May 8, 1987

[30] Foreign Application Priority Data

May 14, 1986 [SE] Sweden ............................. 8602185

[51] Int. Cl.⁴ .............................................. F16D 23/14
[52] U.S. Cl. .................................... 192/98; 192/70.13;
192/110 B; 192/DIG. 1; 403/316; 403/348;
384/535
[58] Field of Search .................. 192/89 B, 110 B, 98,
192/70.13, 70.27, DIG. 1; 403/316, 317, 348;
384/535, 903

[56] References Cited

U.S. PATENT DOCUMENTS

| | | | |
|---|---|---|---|
| 1,867,950 | 7/1932 | Norley | 403/316 |
| 3,167,164 | 1/1965 | Bland et al. | 192/89 B |
| 3,963,105 | 6/1976 | Ernst et al. | 192/98 |
| 3,973,659 | 8/1976 | Ernst et al. | 192/89 B |
| 4,159,052 | 6/1979 | Ernst et al. | 192/98 |
| 4,565,271 | 1/1986 | Lassiaz | 192/89 B |

FOREIGN PATENT DOCUMENTS

| | | | |
|---|---|---|---|
| 1680631 | 1/1970 | Fed. Rep. of Germany | 192/98 |
| 2051976 | 1/1981 | United Kingdom | 192/89 B |

*Primary Examiner*—Leslie A. Braun
*Assistant Examiner*—Richard M. Lorence
*Attorney, Agent, or Firm*—Eugene E. Renz, Jr.

[57] ABSTRACT

A first member, such as a clutch release bearing can be releasably connected to a second member, such as a cup spring in a coupling device, in that the member has a cyclindrical portion, which is insertable in a hole in the second member, the hole being surrounded by radially inwardly directed tongues. The portion is provided with radially outwardly directed projections forming a rim and being of a number and a circumferential extension corresponding to the interspaces between the tongues and which can be displayed through these interspaces. Catch fingers are arranged to be inserted between the tongues and the projections respectively after assembly for preventing unintentional disconnection of the connection. The fingers may be removed from the lock position at dismounting.

1 Claim, 1 Drawing Sheet

CLUTCH RELEASE BEARING ASSEMBLY

FIELD OF THE INVENTION

The present invention relates to improvements in release bearing assemblies particularly adapted for coupling devices.

BACKGROUND OF INVENTION

The device is primarily intended to be used for connection of a clutch release bearing with a cup spring forming part of a coupling. A coupling, e.g. in an automobile, constitutes a member situated between a motor an a gear box. When assembling the driving system, it is thereby an advantage if the coupling is pre-mounted, e.g. upon the motor, whereby the gear box must only be pushed into intended position at the coupling for fitting against the motor. In this case, the clutch release bearing intended for the control of the coupling must be connectable to the cup spring, which causes the compressing force upon the friction discs of the coupling without this spring being reachable from the side facing away from the motor. An arrangement for effecting this is described in, e.g., DE-A 2639766. This arrangement, however, suffers from certain drawbacks. The cup spring, thus, must be provided with a particular connecting member, which must be mounted before the coupling is attached to the motor. The clutch release bearing, furthermore, cannot be dismounted from this connecting member by being pulled back the same way as it was pushed in at the assembly, as a non-reachable locking ring prevents the movement of the bearing in this direction. When dismantling the clutch release bearing it is, thus, necessary that both gear box and coupling are removed from the motor.

The purpose of the present invention is to provide a connecting device of the type mentioned, which allows mounting and dismounting with accessibility from only one side of one of the members to be interconnected, and which does not incorporate such elements which must be premounted upon said member from the inaccessible side. This obtained according to the invention in that the device comprises an annular member having a plurality of circumferentially spaced catch fingers each having an axially extending terminal end portion engageable in a space between the projections on the cylindrical portion of the bearing and normally positioning the spring fingers in a manner to prevent relative rotation of the spring member. The catch fingers are displaceable axially toward the bearing to a point where the terminal end portions disengage the projections to permit relative rotation of the spring member and cylindrical portion to a portion where the catch fingers are aligned with the gaps between the projections to permit disassembly of the spring in an axial direction opposite in an axial direction away from the bearing.

With such a device it is, e.g., possible to mount a coupling on a motor and a clutch release bearing can be mounted on the input shaft of a gear box, whereupon the driving system motor-coupling-gear box can be assembled by the gear box being pushed into the intended position against the motor, whereby the clutch release bearing is automatically connected to the cup spring, which is affecting the coupling friction discs. Dismantling of the clutch release bearing can be effected without the entire coupling having to be removed from the motor.

BRIEF DESCRIPTION OF THE DRAWINGS

These and other objects of the present invention and the various features and details of the operation and construction thereof are hereinafter more fully set forth with reference to the accompanying drawings, wherein.

DESCRIPTION OF THE PREFERRED EMBODIMENT

Figure 1:
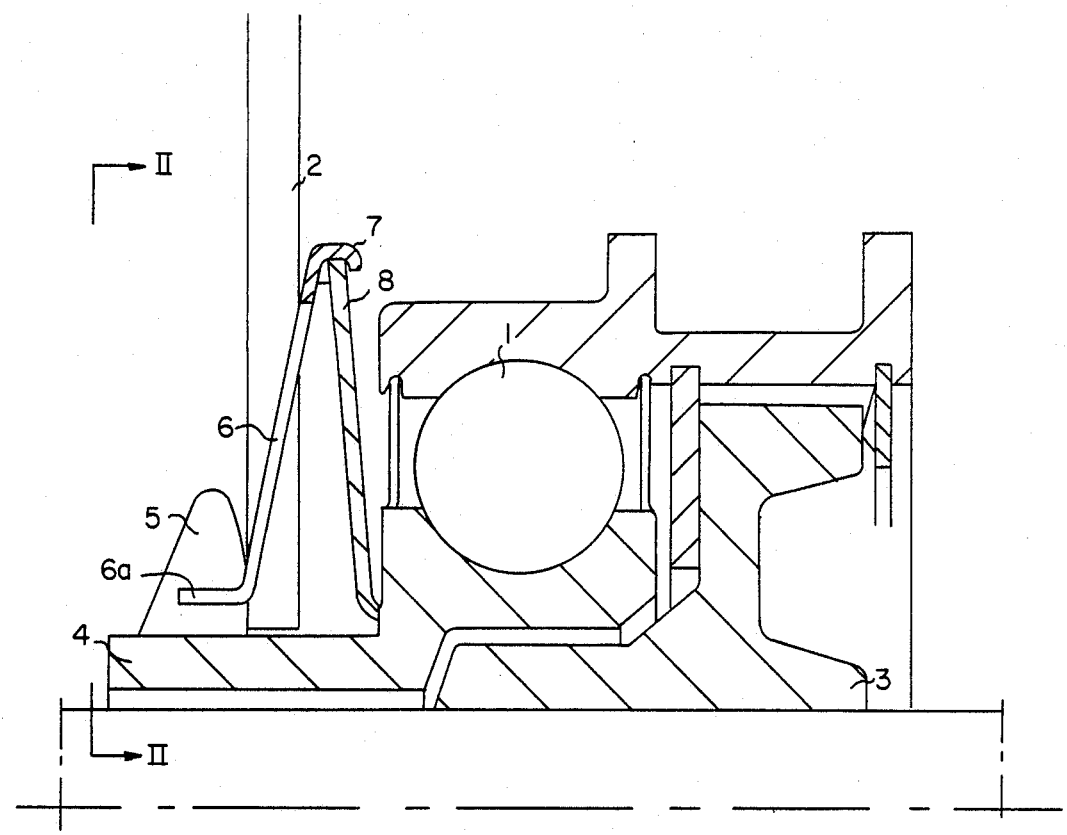
FIG. 1 shows a longitudinal section of parts of the members which are interconnected.
Figure 2:
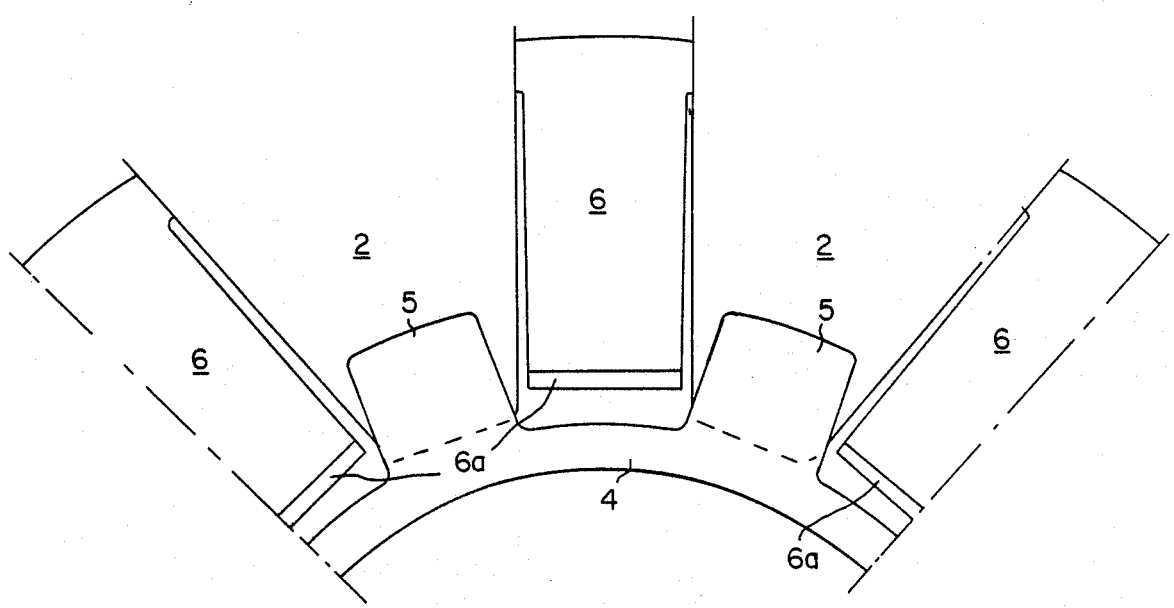
FIG. 2 shows a view according to II—II in FIG. 1 of a section of said members, which in the embodiment shown constitute a clutch release bearing and a spring.

A not further described coupling device incorporates friction elements in the shape of e.g. discs, which in torque transmitting position, in a manner known per se, are pressed against each other by a cup spring. At disengagement, the spring is pulled in a direction against the spring force, thus, that the friction elements are relieved from load. This operation is effected under cooperation of a clutch release bearing 1, which is connected to the spring 2 on one hand and on the other hand to a not shown control device, by means of which the bearing can be displaced along a shaft extending between coupling and gear box. The bearing is guided upon the shaft by a sleeve 3, on which the bearing is arranged with a certain radial play. The cup spring 2 has a central hole and a number of tongues extending from the not shown annular circumference radially inwards, the free ends of said tongues delimiting said hole. A cylindrical portion of the bearing, shaped as a journal 4 is inserted in the hole and is, thus, surrounded by the spring 2. The journal 4 is provided with a number of radially outwardly extending projections 5 forming a rim, which projections in number and circumferential extension correspond to the interspaces between the radial tongues on the spring 2. The journal 4 may be located thus that the projections 5 are situated just infront of these interspaces, whereby the projections can pass through the spring as the journal is pushed into the hole of the spring. The journal 4, after having been pushed through, can be rotated, thus, that the projections 5 take up a position coinciding with and behind the tongues, such as shown in FIGS. 1 and 2. Thereby the journal 4 and the bearing 1 are connected to the spring 2 and this spring can be influenced by the displacement of the bearing for operation of the coupling. In order to let the journal 4 and the projections 5 be held in this position relative to the tongues of the spring 2 during operation, the device is equippd with one or more catch fingers 6 each having an axially extending terminal end portion 6a, which correspond to the interspaces between said projections and tongues and which can project into and be held in and at dismantling of the device be displaced out off the interspace. The catch fingers 6 may preferably be arranged on an annular member 7, which encloses the cylindrical journal 4 and is held with spring force, e.g. by means of a cup spring 8, in position in said interspace. At dismantling of the bearing 1 from the spring 2, the member 7 can be gripped by hand or with a proper tool and be moved in the right hand direction, as shown in FIG. 1, against the action of the spring 8, thus that the catch fingers leave the interspaces between the projections 5, whereby the journal 4 can be rotated thus that the projections are located just in front of the interspaces between the tongues of the spring 2 and the bearing 1 together with the catch fingers can be pulled out off the hole of the spring 2 toward the right-hand side in the figure. At assembly of the device, the member 7 is first together with catch fingers 6 and spring 8 arranged upon the journal 4 beside the inner race ring of the bearing 1, whereby the fingers 6 are situated between the projections 5. These are thereupon positioned just in front of the interspaces between the tongues of the spring 2. The bearing is thereupon pushed towards the left hand side in FIG. 1, thus that the projections 5 pass through the spring 2. The fingers 6 are thereby pressed against the tongues 2 and the spring 8 is compressed. The journal 4 and the member 7 are finally rotated thus that the projections 5 take up the position shown in FIGS. 1 and 2 coinciding with and behind the tongues, and the catch fingers 6 snap in between the projections 5 and the tongues in the spring 2.

Other embodiments of the invention than that described above are, of course, possible within the scope of the claims. The elements interconnected, e.g., need not be clutch release bearing and cup spring, and the catch fingers can be arranged in another manner than on an annular member influenced by a certain spring. They can, e.g., be arranged individually on the element 1, and they themselves can form a part of a resilient member. They also can be connected to the member 2. The journal 4 can be a separate element connected to the bearing 1, and the projections 5 can be arranged upon a ring which is connected to the journal 4.

What is claimed is:

1. A clutch release bearing assembly adapted to be connected to a cup spring member of a coupling, said bearing assembly comprising a bearing including an inner race ring having a generally cylindrical portion (4), said spring member (2) having a plurality of radially inwardly directed tongues having spaces therebetween, a plurality of radially outwardly extending projections (5) circumferentially spaced about the periphery of the cylindrical portion (4), the circumferential spacing of said projections (5) being such that they correspond to the spaces between said radial tongues and of a size to be axially displaceable therethrough, an annular member (7) having a plurality of circumferentially spaced catch fingers (6) each having a terminal end portion (6a) which extends axially in a first direction and is engageable in a respective space between the projections (5) and normally positioning the catch fingers to prevent relative rotation of said spring member (2) and cylindrical portion (4) wherein the tongues are aligned with the projections (5), said catch fingers being displaceable axially toward said bearing in a second direction opposite said first direction to a point where the terminal end portions (6a) disengage said spaces between said tongue to permit relative rotation of said spring member (2) and cylindrical portion (4) to a position where the tongues are aligned with the spaces between the projections (5) to permit disassembly of said bearing assembly from spring member (2) in said second axial direction.

* * * * *